United States Patent [19]

Bellos et al.

[11] Patent Number: 5,439,592
[45] Date of Patent: Aug. 8, 1995

[54] METHOD FOR REMOVAL OF WATER SOLUBLE ORGANICS FROM OIL PROCESS WATER

[75] Inventors: Thomas J. Bellos, St. Louis; Richard D. Keating, Bridgeton, both of Mo.

[73] Assignee: Petrolite Corporation, St. Louis, Mo.

[21] Appl. No.: 299,681

[22] Filed: Sep. 1, 1994

Related U.S. Application Data

[63] Continuation-in-part of Ser. No. 954,370, Sep. 30, 1992, abandoned.

[51] Int. Cl.6 .............................................. B01D 61/00
[52] U.S. Cl. .................................... 210/651; 210/650; 210/652; 210/639; 210/724; 210/799; 210/805; 210/908; 210/96.1
[58] Field of Search ............... 210/651, 650, 652, 805, 210/195.2, 257.2, 799, 724, 908, 639, 96.1

[56] References Cited

U.S. PATENT DOCUMENTS

| | | | |
|---|---|---|---|
| 4,000,065 | 12/1976 | Ladha et al. | 210/195.2 |
| 4,111,812 | 9/1978 | Baddour | 210/259 |
| 4,201,664 | 5/1980 | Hekal | 210/651 |
| 4,332,686 | 1/1982 | Gerlach et al. | 210/651 |
| 4,818,410 | 4/1989 | Bellos et al. | 210/639 |
| 4,886,603 | 12/1989 | Taylor | 210/639 |
| 4,996,693 | 10/1990 | Brandt et al. | 210/195.2 |
| 5,069,780 | 12/1991 | Thalmann et al. | 210/321.65 |
| 5,104,545 | 4/1992 | Means et al. | 210/650 |
| 5,135,656 | 8/1992 | Means et al. | 210/662 |

OTHER PUBLICATIONS

"The Treatment of Waste Emulsified Oils by Ultrafiltration", P. A. Bailey, Filtration and Separation, Jan. 2, 1977, pp. 53-55.

Primary Examiner—Robert A. Dawson
Assistant Examiner—Ana M. Fortuna
Attorney, Agent, or Firm—Kenneth Solomon

[57] ABSTRACT

A method for removal of water soluble organics from acidified oil process water is disclosed. The method comprises a step in which free oil is removed from such water by water-wet ultrafiltration to produce a water-rich filtrate stream which is then directed through a reverse osmosis membrane to produce a WSO-depleted stream and a WSO-rich reject stream. The method includes a recycle stream.

28 Claims, 1 Drawing Sheet

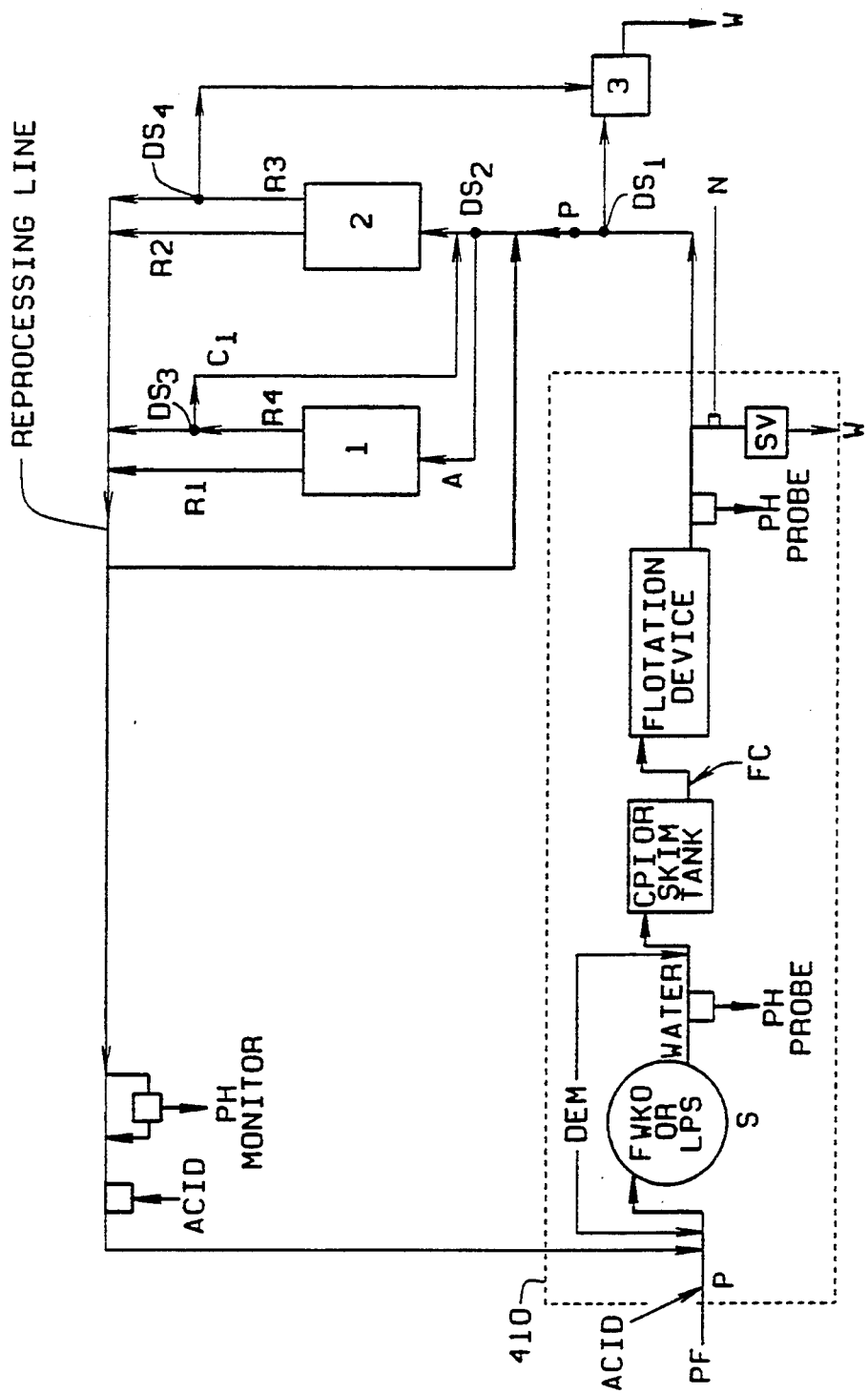

METHOD FOR REMOVAL OF WATER SOLUBLE ORGANICS FROM OIL PROCESS WATER

This application is a continuation-in-part of application Ser. No. 954,370, filed Sep. 30, 1992, now abandoned.

BACKGROUND OF THE INVENTION

1. Field of the Invention

The present invention relates to the removal of water soluble organics (WSO) from oil process water, and more particularly to the removal of certain water soluble petroleum organics as well as non-hydrocarbon organic materials (NHOM) from crude oil production water and from aqueous streams used in removing water and/or organic salts, such as sodium chloride, from crude oil, residual oil, waste oils and the like.

2. Description of the Prior Art

In the removal of crude oil production fluid from earth formations, significant quantities of water are quite often removed along with the oil. In the Middle East, the production fluid can be virtually pure oil. However, it is not uncommon that oil well production fluids are composed of 90% or more of water and only 10% or less of crude oil. Such water is referred to as connate water and is produced along with the oil. One of the first steps after removal of the oil well production fluid is to separate the oil from the water by phase separation techniques. Separation is conventionally accomplished using a bulk separator or a free water knockout system. Virtually all of the hydrocarbon is conveniently recovered in this manner. Unfortunately, at some geographical areas, small amounts of oil (50–1,000 ppm) and salts of certain water soluble organic compounds, as well as inorganic salts and acids, are present. The water soluble substances are not removed when the production fluid is subjected to typical separation regiments. Water soluble organics include, among other things, certain naphthenates, phenols, lower fatty acids, etc. Water soluble inorganics salts include sodium chloride, sodium sulfate, calcium chloride, barium chloride, etc. While the amount of water soluble organics may be relatively small, up to 1,000 ppm (0.1%) or more, they nevertheless give rise to environmental problems, when the aqueous phase is discharged into the environment without removal of the water soluble organics. These organic products can complicate environmental concerns where this water is or can be discharged. Furthermore, the water soluble organics may be valuable substances. In order to meet the present day strict environmental standards, a process to reduce the level of water soluble organics in the discharged streams to 29 ppm or less is needed. Some known methods can reduce the content of water soluble organics to this level. For example, one could separate the water and water soluble organics by distillation or the use of biological treating ponds. However, such methods are relatively complex and/or expensive, requiring extensive periods of time to carry out these processes in comparison with the process of the present invention. U.S. Pat. No. 4,818,410 to Bellos (a co-inventor herein) et al. shows a less expensive and simpler technique. Nevertheless, increasingly stringent environmental standards may render it desirable, in some cases, to reduce the WSO content even further. The ability to achieve such reduction is beyond the capability of commercial methods if, for example, producers were required to reduce their organic levels in the discharge water to a much lower level such as 10 ppm.

Another method is disclosed in U.S. Pat. No. 5,104,545 to Means et al. This disclosure illustrates the great expense the industry is willing to incur for greater removal of water soluble organics. The method of Means et al. further involves problems with spoilation of the resin when it becomes oil wet and requires plentiful amounts of solvent or solvent regeneration. Further, these ion exchange resins are very expensive to employ.

Use of certain petroleum fuel oils for specific purposes requires that such oil be treated in order to remove undesirable corrosive contaminants therefrom. For example, fuel oils used in the newer, high efficient, gas turbine power plants must meet certain strict requirements with respect to the presence of inorganic contaminants in the oil. The presence of sodium chloride and other similar inorganic salts renders the oil less than suitable as a fuel in gas turbine power plants. To upgrade fuel oil so that it is acceptable for use in the turbines, the fuel oil is commonly processed using a multistage electrostatic desalting facility. In such operation, essentially complete removal of water soluble inorganic salts from fuel oil is accomplished by a counter current water washing process in which a high electrostatic gradient is used to break the interim water-in-oil emulsion. Selective specialized chemical demulsifiers are normally used in such salt removal processes. While the process removes the inorganic salts from the fuel oil, unfortunately, the wash water removes the water soluble organics from the fuel oil as well. In view of strict environmental standards, it is of considerable importance to remove these water soluble organics present in the wash water of the inorganic salt removal processes used to render the fuel acceptable for burning in turbines.

Thus, it is advantageous to provide a method that removes WSO's from oil well production fluids as well as from aqueous streams used to render fuel oil acceptable for use as fuel for gas turbine power plants. If these organic materials (WSO) are converted to their salts, such salts are even more destructive to the turbines. As noted, in U.S. Pat. No. 4,818,410 (Bellos et al), a method for removal of water soluble organics from oil process water and which is designed for such applications was disclosed. However, there is the ever present desire and the potential for further regulation to reduce the content of water soluble organics (especially non-hydrocarbon organic material) to an even greater extent.

SUMMARY OF THE INVENTION

Briefly, therefore, the present invention is directed to a method for removing water soluble organics from acidified oil process water. The method involves removal of free oil (and, accordingly, the water soluble organics in the oil) from the water to be treated by passage of the water through water-wet ultrafiltration modules in an ultrafiltration unit to produce a water-rich stream and an oil-rich reject stream. It has been found that if the ultrafiltration modules are ones that by their chemical composition become oil wet, flow to these units may be turbulent enough such that the fluid shear cleans the module surfaces automatically. Further, water soluble organics are removed from the water-rich filtrate stream by passage of the water-rich filtrate stream through a reverse osmosis membrane to produce a WSO-depleted stream (that is, a stream of reduced WSO content) and a WSO-rich reject stream.

At least one of the reject streams is recycled for retreatment by the ultrafiltration units or the reverse osmosis membrane, or both, to produce an oil and WSO-depleted stream. This is accomplished by returning one or both of the oil or WSO rich streams to the first treatment vessel (e.g., a FWKO) or to another location found through experience or experimentation, to be more advantageous.

The present invention is also directed to an apparatus useful in such method that combines an ultrafiltration unit whose chemical composition causes it to remain water wet with a reverse osmosis membrane having a low enough molecular weight rejection that it will be useful for the removal of much of the WSO, and means for communication therebetween.

Among the several advantages of the invention, therefore, may be noted the provision of a method for treatment of oil process water to remove water soluble organics to an even greater degree than previously accomplished.

BRIEF DESCRIPTION OF THE DRAWING

FIG. 1 is a schematic block diagram showing the process of this invention in combination with the pre-treatment technique of U.S. Pat. No. 4,818,410, wherein a production fluid is treated. The pre-treatment technique of U.S. Pat. No. 4,818,410 is enclosed within dashed loop designated "410".

DETAILED DESCRIPTION OF THE PREFERRED EMBODIMENTS

In accordance with the present invention, it has been discovered that by treating acidified oil process water by a two step method involving water-wet ultrafiltration of the water followed by reverse osmosis, water of greatly reduced non-hydrocarbon organic material (NHOM) and oil content may be produced. This method may be carried out as a stand-alone apparatus for treating the oil process water directly with addition thereto of acid as the sole pre-treatment, or may be carried out in conjunction with a more involved pre-treatment, preferably for removal of some of the WSO (such as the relatively higher weight WSO), to treat further the resulting pre-treated stream. As used herein, "oil process water" refers to any oil production water or industrial water that contains oil and WSO.

It is preferred in the method of this invention that the oil process water be pre-treated to reduce the water soluble organics to some extent, thereby to preserve the life of the ultrafiltration and reverse osmosis units. The technique of U.S. Pat. No. 4,818,410 to Bellos et al. has been found to be a particularly well suited pre-treatment for coordination with the ultrafiltration and reverse osmosis techniques of this invention. Although such known pre-treatment methods are very effective in reducing water soluble organics, typically they still leave a measurable amount of water soluble organics, particularly non-hydrocarbon organic materials, in the treated water. In addition, as a result of the source of the water and the pre-treatment techniques that involve contacting the water with oil and acid, and may also employ demulsifiers, the water generally also contains free oil dispersed therethrough even after separation of the bulk of the oil from the water.

The reverse osmosis (RO) membranes are designed to reject molecules of specific molecular weight. Thus, some available RO membranes reject molecules, for example, above 125 MW. RO membranes with lower MW rejection may be employed, limited only by the RO membrane technology. Likewise, improvements being made continually with ultrafiltration design and as improvements are made, the improved units may be employed.

It is conventional to denote the water soluble organics found in and recovered from petroleum generally as "petroleum acids" and more specifically as "naphthenic acids". Chemically, the petroleum acids are, in the main, monocarboxylic acids related to the naphthalene (alicyclic) series of hydrocarbons. However, other petroleum acidic substances are included. For example, substituted phenols, mercaptans, long chain ketones, etc. may act as petroleum acids in the sense of this process. Petroleum acids are natural components of crude oil and are not formed by refining. A typical formula of these acids may be written as $R(CH_2)_nCOOH$, wherein R may be cyclic moiety composed of 1,2,3 or more rings including such acids as cyclophentaneacetic acid and trans-2,2,6-trimethylcyclohexylacetic acid and n is usually one or higher. Aromatic rings, saturated rings and fused rings are normally present. It has been found that as many as 120 or more different petroleum acids may be present in a given crude oil production fluid. It is with these water soluble organics that the present invention is concerned as well as with non-hydrocarbon organic material (NHOM). Most are soluble in all proportions of hydrocarbons, but most of the acids of this series have only slight solubility in water. For example, it is known that acids such as formic, acetic propenoic and butyric acid often are present in some oilfield water. Whether they are by-products or the result of some biogenic process is not totally known. However, these acids, as well as their sodium and other alkali metal salts are preferentially water soluble. While these acids are not naphthenic acids, per se, they are lumped in with them as a portion of the WSO.

It is to be understood that, at the pH of naturally occurring aqueous compositions, the acids may exist as anions in association with counter ions of sodium, calcium, etc. For example, naphthenic acids can be regarded as being present as naphthenate salts. Often, therefore, petroleum acids in the aqueous phase of oil production fluids are in anionic form and may be more properly termed as petroleum carboxylate salts, phenates and other salts.

According to the present method, the water to be treated contains oil, salts and WSO and has been acidified to convert the naphthenates to their acid forms, thereby to induce migration to the oil in the water. This acidification may take place pursuant to pre-treatment as noted above. In the acidification, the added acid adjusts the pH of both phases; that is, of the oil and water. In practice, the pH at the zone of acid addition might be very low (e.g., less than 1), but as the acid disperses, the resulting pH drop might be very small, such as a drop of about 0.2 to about 0.4. The acidified water is supplied to an ultrafiltration module to remove the free oil in the water to be treated. FIG. 1 shows the present method including an optional pre-treatment in accordance with the teachings of U.S. Pat. No. 4,818,410. The pre-treatment is shown in FIG. 1 within the dashed loop labeled "410". According to this pre-treatment, a production fluid PF is acidified by addition thereto of an aqueous solution of a strong acid (which may be a combination of mineral and organic acids) at point P. The acidified stream is then pumped to a separator S, which may be free-water knock-out (FWKO)

or a low pressure separator (LPS), to remove the oil. It is this acidification of the production fluid (where oil and water are present together) that converts the naphthenates to their acid form (and may be protonated) which now have an affinity for oil (usually $C_5$–$C_6$ and above). The stream may be treated before or after oil removal to break an emulsion, if any. This determination (whether to treat before or after) for optimal performance may be made by simple experimental testing at the site. Usually, the emulsion is a reverse emulsion (i.e., an oil-in-water emulsion) and so a reverse demulsifier is used. Dashed line DEM illustrates two possible points of addition of the demulsifier. The outlet water stream may still contain some oil and so it can be further treated by a corrugated plate interceptor (CPI) or a skim tank, and a flotation chemical (FC) may be added and further oil/water separation effected by a flotation device. The resulting stream can be monitored and, if it meets the applicable standards, it can be released overboard (waste W). If the sole failure to meet standards is the acidity of the stream, caustic N may be added by injection and the stream thereby neutralized may be released overboard. If desired, the stream may be collected and pH monitored periodically in a small surge vessel SV for periodic release overboard (W). The pretreatment may be carried out in a primary treatment vessel. For details of this acidification and separation technique, resort may be made to U.S. Pat. No. 4,818,410, which is incorporated herein by reference.

At times, nevertheless, the resulting stream from this pre-treatment still might not meet the relevant environmental standards, particularly if the standards become more stringent than currently in force. In some cases, the failure may be remedied by treatment with an ion exchange resin or activated charcoal (identified in FIG. 1 as "3"), and the thus-treated stream released overboard (W). In many cases, however, such treatment would not be sufficient, but would be costly and problematic as it relates to regenerating the resin either by solvent washing and, in the case of activated charcoal, the transfer of the material to an oven to burn off the contaminates. Instead of ion exchange or charcoal treatment, the stream may be treated in accordance with this invention, particularly in cases in which the stream contains significant amounts of higher molecular weight NHOM.

Thus, a water stream and/or a mixed water/oil stream, whether pre-treated by the above-described technique or by another technique or a production fluid that has not been pre-treated other than by acidification, is treated according to the present method by subjecting it to ultrafiltration followed by reverse osmosis. The ultrafiltration modules should be of a chemical composition that they remain "water wet". Otherwise, the pumping rates become so high as the filter clogs with oil that the energy expended in pumping would be prohibitive and the modules may be damaged permanently and thereby shortening their lives.

The supply stream to the ultrafiltration module is designated in FIG. 1 as "A" and the ultrafiltration module is labelled "1". On the way to the ultrafiltration unit, the supply stream may be tested and, if it meets certain waste standards, the stream can be diverted such as by means of diverting switch $DS_1$ to overboard waste W, with optional treatment with activated charcoal (designated in FIG. 1 as 3), or pumped by pump P to the ultrafiltration unit 1 or (if the oil content of the stream is sufficiently low) diverted such as by means of diverting switch $DS_2$ directly to the reverse osmosis membrane (designated in the Figure as 2). Thus, the stream may be treated differently at different times, depending on its level of contamination at the time. In any event, the method can still be carried out as a continuous flow process.

The ultrafiltration module employs at least one water-wet ultrafiltration membrane. A water-wet membrane is one that by its chemical make-up remains water-wet (that is, in contact with water) as opposed to oil-wet (i.e., oil-coated). Such membranes are sold, for example, by Bend Research, Inc. The ultrafiltration module is made up of hollow fibers and is analogous to large tube membranes, with a reverse osmosis membrane on the inside of a porous support tube, but with a smaller diameter (0.025 inches versus 0.5 to 1 inch; i.e., 0.06 cm versus 1.27 to 2.54 cm) and a much tighter packing density inside a module, resulting in a much larger flow due to the larger membrane area.

Thus, in conventional (fine) hollow fiber technology, the membrane is supported on the outside of the smaller tubes (0.002 inch; i.e., 0,005 cm) packing inside a pressure vessel and the feed water passes from the outside of the fibers to the center. By contrast, in the ultrafiltration modules utilized in the process of this invention, the fibers themselves, with a burst strength of 800 to 1,100 psi, act as the pressure vessel, allowing them to be packed in readily available PVC pipes. The hollow fibers of the ultrafiltration unit may be, for example, of 0.026 cm inside diameter, 0.062 cm outside diameter, 0.018 cm wall thickness and about 0.0018 cm estimated reverse osmosis skin thickness. The close packing of the layers of spiral wound cartridges and of conventional hollow fibers make them more prone to solids and oil fouling, and to short-circuiting and dead spots. The relatively large size of the hollow fibers (0.0254 cm diameter or greater) of the ultrafiltration module requires removal of suspended solids down to the 50 to 100 micron range prior to the reverse osmosis system.

The ultrafiltration membranes may be formed of polyamide treated with urethane. In laboratory tests, exemplary suitable membranes have been found in tests to reject nearly all of the stearic acid, about three-quarters of the 2-ethylhexanoic acid and about half the hexanoic acid, but virtually none of the acetic acid from water containing 500 ppm (by weight) free and emulsified oil without fouling, with a reject stream rate of about 10% of the inlet stream. In the process of this invention, the ultrafiltration step may be accomplished by a single module or by a plurality of modules placed either in parallel or in series. For example, four 20 ft$^2$ modules followed by three 10 ft$^2$ modules arranged in series may be used to treat about 1.0 to about 2.7 gallons per minute of water containing about 200 to 275 parts per million (by weight) free and emulsified oil. In addition, a pre-filter, such as a self-cleaning Cuno filter, may be included before the ultrafiltration module to prolong the life of the module. However, as described for use as an adjacent to the process of U.S. Pat. No. 4,818,410, a Cuno filter would be superfluous.

The water-wet ultrafiltration removes residual free oil and solids from the water stream. The reject stream (designated in FIG. 1 as R1) therefore contains enriched oil and may be recycled back to the beginning of the process via the Reprocessing Line with treatment as to be discussed below with respect to the Reprocessing Line, while the oil-depleted, water-rich filtrate stream R4 that passes through (the permeate) is relatively oil-free water; that is, oil-free or far lower oil content—for example, less than 10 ppm, such as 3 to 8 ppm, which corresponds to less than ten percent, typically less than five percent, of the oil concentration of the feed. However, the permeate still contains water soluble organics of concern, if any, but to a reduced degree to the extent some were removed with the oil. This oil-depleted, water-rich stream, which is about 80 to 90% of the flow rate of the feed stream, then is routed to a reverse osmosis membrane 2 via permeate or aqueous stream R4 and conduit $C_1$, or if retreatment is required, diverted by means of diverting switch $DS_3$ to recycle by means of the Reprocessing Line.

The reverse osmosis unit preferably is of the spiral wound variety but not limited to this technology. For example, for a flow rate compatible with four 20 ft$^2$ ultrafiltration modules, the unit may comprise, for example, three 10 ft$^2$ Film-Tec spiral wound modules in series, selected according to the degree of purity desired. For instance, Film-Tec modules NF-30, NF-70 and FT-30 are designed to rejection 30% 70% and 99.6% sodium chloride, respectively. Higher purity, however, comes at the expense of decreased flow rate. It has been found that the higher molecular weight water soluble organics, including non-hydrocarbon organic material, such as those molecules of molecular weight greater than about 125 do not pass through the reverse osmosis membrane. More recently developed RO membranes may reduce even lower molecular weight organic molecules.

Thus, a WSO-rich aqueous stream R2 and a WSO-depleted permeate aqueous stream R3 exit the RO membrane 2. The WSO-rich aqueous stream R2 may be recycled via the Reprocessing Line. The aqueous stream R3 emerging from the RO membrane (the permeate) contains greatly reduced concentrations of non-hydrocarbon organic materials and other organics (perhaps on the order of three to eight ppm total oil or grease) and, if the aqueous stream R3 now meets the relevant standards, it may be routed by diverting switch $DS_4$ via conduit $C_2$ and released overboard (W), optionally with treatment with an ion exchange resin of activated charcoal 3 before release overboard. Practices designated by regulatory agencies may involve extraction processes to measure the concentration of regulated material (oil and grease) in effluent water. Such processes may produce an artificially low number or may be unable to detect the low levels of contaminants remaining in the treated stream because of the methodology. Therefore a water stream containing some WSO may register zero or very low levels when subjected to the test method. If the stream R3 still does not meet desired standards, it may be diverted by diverting switch $DS_4$ to the Reprocessing Line for recycling.

In summary, the options for the reject streams are as follows:

The oil-rich reject stream R1 from the water-wet ultrafiltration can be recycled via the Reprocessing Line. The oil-depleted stream R4 from the ultrafiltration might be of satisfactorily low oil concentration and, if so, may be diverted by diverting switch $DS_3$ and routed (by conduit $C_1$) to the reverse osmosis membrane 2. Otherwise, stream R4 may be recycled via the Reprocessing Line.

The WSO-rich reject stream R2 from the reverse osmosis membrane 2, which might be about 10% to about 25% of the original flow rate of oil-containing water to be treated, likewise may be recycled via the Reprocessing Line.

The WSO-depleted stream R3 may be diverted by diverting switch $DS_4$ to be treated with the ion exchange resin or activated charcoal 3, if desired, and released overboard (W) or stream R3 be recycled via the Reprocessing Line.

The streams recycled via the Reprocessing Line may be acidified further and returned to be treated in accordance with the method of U.S. Pat. No. 4,818,410, or they may be acidified further, and routed to another desired return point. Alternatively, the streams carried by the Reprocessing Line may be recycled to a point P after the pre-treatment (if the pre-treatment is included in the overall process). When the apparatuses (UF and RO units) are used as an adjunct to the treatment scheme of U.S. Pat. No. 4,818,410, the life expectancy of these units may be increased because of the greatly reduced load placed on them.

EXAMPLE 1

Oil-containing water was fed through a pre-filter (a self-cleaning Cuno filter) to a first stage pump and pumped to a first bank of water-wet ultrafiltration membranes consisting of four 20 ft$^2$ modules provided by Bend Research, Inc. The reject stream containing enriched concentrations of oils, solids and organics was emitted at a flow rate 10–25% that of the feed. The permeate from the first stage, which was relatively free of emulsified oil, was collected in a tank to feed a high pressure second stage consisting of three spiral wound modules from Film-Tec (an NF-30 filter in series with an NF-70 filter and an FT-30 filter). The feed, first stage permeate and second stage permeate were tested at start-up and two hours later. The results are shown in Table I on the following page:

TABLE 1

| | | Oil/Grease Concentration (mg/l) | | TSS | TDS |
|---|---|---|---|---|---|
| | Sample | Non-Acidified | Acidified | (mg/l) | (mg/l) |
| Start-up: | Feed | — | — | 218 | 29,428 |
| | First Stage Permeate | — | — | 140 | 27,730 |
| | Second Stage Permeate | — | — | 38 | 30,152 |
| 2 Hours Later: | Feed | 275 | 290 | 96 | 28,230 |
| | First Stage Permeate | 60 | 86 | 54 | 27,793 |
| | Second Stage Permeate | 50 | 56 | 0 | 95 |

EXAMPLE 2

The apparatus of Example 1 was used to treat another water source, except that in the first stage, one 20 ft$^2$ module was missing and one 10 ft$^2$ module appeared to have ruptured (perhaps in transit). Thus, the membrane area was reduced from 110 ft$^2$ to 80 ft$^2$, thereby reducing the flow through the first stage by 27%. The following results shown in Table 2 were obtained from measurements of the various feeds and permeates taken upon reaching steady state conditions:

TABLE 2

| Sample | Oil/Grease Concentration (mg/l) | |
|---|---|---|
| | Acidified | Non-Acidified |
| Feed to Cuno Filter | 195 | 30 |
| Feed to First Stage | 210 | 30 |
| First Stage Permeate | 140 | 10 |
| Feed to NF-30 Filter | 165 | 10 |
| NF-30 Filter Permeate | 150 | 5 |
| Feed to NF-70 Filter | 155 | 5 |
| NF-70 Filter Permeate | 40 | 5 |
| Feed to FT-30 Filter | 155 | 5 |
| FT-30 Filter Permeate | 5 | 5 |

EXAMPLE 3

The apparatus of Example 1 was run for various periods over four days under a variety of conditions (pressures, flow rates, recycle rates, recovery rates, etc.). The results are shown in Tables 3–6, on the following pages:

TABLE 3

FIRST STAGE

| Day | Time | Pressure (psi) | Permeate Flow (l/min) | Reject Flow (l/min) | Recovery (%) | Influent Oil/Grease Concentration (mg/l) | | | Permeate Oil/Grease Concentration (mg/l) | | |
|---|---|---|---|---|---|---|---|---|---|---|---|
| | | | | | | Total | Free/Emuls. | Soluble | Total | Free/Emuls. | Soluble |
| 1 | 10:23 | 240 | 3.01 | 0.80 | 79 | 211 | 20 | 191 | 193 | 6 | 187 |
| 2 | 8:07 | 205 | 2.07 | 1.71 | 55 | 336 | 20 | 316 | 71 | 4 | 67 |
| 2 | 8:36 | 260 | 2.9 | 0.83 | 78 | 336 | 20 | 316 | 98 | 6 | 92 |
| 2 | 9:02 | 305 | 3.52 | 0.27 | 93 | 336 | 20 | 316 | 140 | 4 | 136 |
| 3 | 8:25 | 240 | 1.76 | 1.51 | 54 | 298 | 16 | 282 | 90 | 2 | 88 |
| 3 | 8:55 | 300 | 2.25 | 0.56 | 80 | 298 | 16 | 282 | 133 | 4 | 129 |
| 3 | 12:50 | 340 | 2.65 | 0.08 | 97 | 298 | 16 | 282 | 244 | 6 | 238 |
| 4 | 8:37 | 330 | 2.23 | 0.28 | 89 | 420 | 26 | 394 | 142 | 6 | 136 |
| 4 | 9:20 | 270 | 1.74 | 0.87 | 67 | 420 | 26 | 394 | 124 | 7 | 117 |
| 4 | 9:30 | 300 | 1.75 | 0.39 | 82 | 420 | 26 | 394 | 150 | 4 | 146 |

TABLE 4

SECOND STAGE, NF-30 FILTER

| Time | Pressure (psi) | Permeate Flow (l/min) | Reject Flow (l/min) | Recovery (%) | Influent Oil/Grease Concentration (mg/l) | | | Permeate Oil/Grease Concentration (mg/l) | | |
|---|---|---|---|---|---|---|---|---|---|---|
| | | | | | Total | Free/Emuls. | Soluble | Total | Free/Emuls. | Soluble |
| 10:11 | 500 | 1.01 | 0.84 | 55 | 146 | 4 | 142 | 28 | 3 | 25 |
| 10:45 | 520 | 1.10 | 0.20 | 85 | 146 | 4 | 142 | 30 | 2 | 28 |

TABLE 5

SECOND STAGE, NF-70 FILTER

| Day | Time | Pressure (psi) | Permeate Flow (l/min) | Reject Flow (l/min) | Recovery (%) | Influent Oil/Grease Concentration (mg/l) | | | Permeate Oil/Grease Concentration (mg/l) | | |
|---|---|---|---|---|---|---|---|---|---|---|---|
| | | | | | | Total | Free/Emuls. | Soluble | Total | Free/Emuls. | Soluble |
| 1 | 9:32 | 600 | 0.94 | 0.89 | 51 | 133* | 4* | 129 | 6 | 2 | 4 |
| 1 | 11:13 | 800 | 1.01 | 0.31 | 77 | 133* | 4* | 129 | 8 | 2 | 6 |
| 2 | 11:26 | 550 | 0.73 | 0.70 | 51 | 128 | 4 | 124 | 6 | 2 | 4 |
| 2 | 12:20 | 610 | 0.60 | 0.25 | 71 | 140 | 4 | 136 | 9 | 2 | 7 |

*Data missing; values approximate.

TABLE 6

SECOND STAGE, FT-30 FILTER

| Day | Time | Pressure (psi) | Permeate Flow (l/min) | Reject Flow (l/min) | Recovery (%) | Influent Oil/Grease Concentration (mg/l) | | | Permeate Oil/Grease Concentration (mg/l) | | |
|---|---|---|---|---|---|---|---|---|---|---|---|
| | | | | | | Total | Free/Emuls. | Soluble | Total | Free/Emuls. | Soluble |
| 1 | 2:26 | 850 | 0.53 | 2.26 | 19 | 193 | 6 | 187 | 12 | 2 | 10 |
| 2 | 9:42 | 710 | 0.37 | 0.39 | 48 | 124 | 4 | 120 | 6 | 2 | 4 |
| 2 | 11:52 | 500 | 0.21 | 0.40 | 35 | 124 | 4 | 120 | 27 | 2 | 25 |
| 2 | 2:07 | 500 | 0.13 | 0.08 | 61 | 124 | 4 | 120 | 28 | 2 | 26 |
| 3 | 1:10 | 530 | 0.57 | 2.90 | 39 | 6 | 2 | 4 | 6 | 1 | 5* |
| 3 | 1:51 | 420 | 0.40 | 7.97 | 5 | 6 | 2 | 4 | 7 | 1 | 6* |
| 3 | 2:04 | 540 | 0.47 | 0.62 | 43 | 6 | 2 | 4 | 4 | 1 | 3* |
| 3 | 2:17 | 540 | 0.39 | 0.09 | 81 | 6 | 2 | 4 | 4 | 1 | 3* |
| 3 | 2:30 | 800 | 0.47 | 0.04 | 92 | 6 | 2 | 4 | 4 | 1 | 3* |
| 4 | 2:02 | 810 | 0.29 | 0.15 | 66 | 140 | 4 | 136 | 3 | 1 | 2 |
| 4 | 2:20 | 800 | 0.49 | 0.88 | 36 | 140 | 4 | 136 | 2 | 1 | 1 |
| 4 | 2:32 | 740 | 0.44 | 1.37 | 24 | 140 | 4 | 136 | 2 | 1 | 1 |
| 4 | 2:45 | 700 | 0.42 | 2.61 | 14 | 140 | 4 | 136 | 3 | 1 | 2 |

*These data points not included in average % removal calculation.

The first stage removed an average of 76% of the oil over four days, sometimes exceeding 80–85% removal at lower permeate flow rates, and consistently reduced the free oil to 6 ppm or less. Moreover, the ultrafiltration of the first stage even removed some of the water soluble organics (WSO's). Except for a couple of questionable samples, the ultrafiltration membranes averaged 66% WSO removal, occasionally removing up to 79% of the WSO's. The second stage reverse osmosis membranes also achieved significant WSO reduction. The NF-30 filter, rated at 30% NaCl rejection, averaged 80% WSO removal over the brief period it was employed. The NF-70 filter, rated at 70% NaCl rejection, rejected an average of 96% of the WSO's, reducing the levels to as low as 4 ppm from 129 ppm. The FT-30 filter, rated at 99.6% NaCl rejection, averaged 93% WSO removal even including the samples taken on the first day, when the module was probably pushed beyond its practical limits.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for removal of water soluble organics from acidified oil process water containing water, oil, salts and water soluble organics, the method being a continuous-flow process comprising the steps of:
   a. removing free oil and thus water soluble organics from the acidified oil process water by continuous-flow, water-wet ultrafiltration through an ultrafiltration unit to produce a water-rich filtrate stream and an oil-rich reject stream;
   b. further removing water soluble organics from the water-rich filtrate stream by passage of the water-rich filtrate stream from the ultrafiltration unit through a reverse osmosis membrane to produce a WSO-depleted stream and a WSO-rich reject stream; and
   c. recycling at least one of the reject streams back for retreatment by at least one of the ultrafiltration unit and the reverse osmosis membrane to produce an oil and WSO-depleted stream.

2. A method as set forth in claim 1 wherein the retreatment comprises ultrafiltration followed by reverse osmosis.

3. A method as set forth in claim 1 wherein the recycling step is carried out by directing each stream to be recycled through a reprocessing line and acid is added to the reprocessing line for additional treatment.

4. A method as set forth in claim 3 wherein sufficient acid is added to drop the pH of the stream in the reprocessing line below about one.

5. A method as set forth in claim 3 wherein both the oil-rich and the WSO-rich reject streams are recycled back through the reprocessing line ahead of the ultrafiltration unit for retreatment by ultrafiltration followed by reverse osmosis.

6. A method as set forth in claim 1 further comprising, prior to step (a), a pre-treatment step wherein oil process water is treated by incorporating in the oil process water a strong acid to adjust the pH to within the range of about 2 to about 6, thereafter or simultaneously making intimate contact between the acidified water and oil with the result that the content of water soluble organics in the acidified water is substantially reduced by being transferred from the water to the oil, and then separating the oil and the water, the resulting water being the pre-treated oil process water.

7. A method as set forth in claim 6 wherein the retreatment comprises ultrafiltration followed by reverse osmosis.

8. A method as set forth in claim 7 wherein the retreatment further comprises the pre-treatment step prior to the ultrafiltration.

9. A method as set forth in claim 6 wherein the recycling step is carried out by directing each stream to be recycled through a reprocessing line and acid is added to the reprocessing line for additional treatment.

10. A method as set forth in claim 9 wherein both the oil-rich and the WSO-rich reject streams are recycled back through the reprocessing line ahead of the ultrafiltration unit for retreatment by ultrafiltration followed by reverse osmosis.

11. A method as set forth in claim 10 wherein the reject streams are recycled back through the reprocessing line ahead of the pre-treatment step.

12. A method as set forth in claim 9 wherein sufficient acid is added to drop the pH of the stream in the reprocessing line below about one.

13. A method as set forth in claim 6 wherein the water-rich filtrate stream from the ultrafiltration unit is monitored and if its oil content is above a selected level, it is recycled for retreatment by the pre-treatment method and ultrafiltration until its oil content falls below the selected level.

14. A method as set forth in claim 6 wherein the water-rich filtrate stream from the ultrafiltration unit is monitored and if its oil content is above a selected level, it is recycled for retreatment by the pre-treatment method and ultrafiltration until its oil content falls below the selected level.

15. A method as set forth in claim 6 wherein the WSO-depleted stream is monitored and if it has a WSO content above a selected level, it is recycled for retreatment by the pre-treatment step, ultrafiltration and reverse osmosis until its WSO content falls below the selected level.

16. A method as set forth in claim 1 wherein the water-rich filtrate stream from the ultrafiltration is monitored and if the water-rich filtrate stream has an oil content above a selected level, the water-rich filtrate stream is recycled for retreatment by the ultrafiltration until the oil content of the water-rich filtrate stream falls below the selected level.

17. A method as set forth in claim 1 wherein the WSO-depleted stream is monitored and if it has a WSO-content above a selected level, it is recycled for retreatment by reverse osmosis until the WSO content of the WSO-depleted streams falls below the selected level.

18. A method as set forth in claim 16 wherein the retreatment further comprises ultrafiltration prior to the reverse osmosis.

19. A method as set forth in claim 1 wherein the ultrafiltration is a single pass ultrafiltration.

20. A method as set forth in claim 19 wherein the single pass ultrafiltration includes a recycle stream from a reject stream of the reverse osmosis membrane.

21. A continuous-flow method for removal of water soluble organics from oil process water, comprising a. pre-treating the oil process water to reduce the content of water soluble organics in the oil process water to produce pre-treated oil process water;
b. removing free oil from the pre-treated oil process water by continuous-flow water-wet ultrafiltration to produce a water-rich filtrate stream;
c. removing water soluble organics from the water-rich filtrate stream by passage of the water-rich filtrate stream through a reverse osmosis membrane to produce a WSO-depleted stream and a WSO-rich reject stream; and
d. recycling at least one of the reject streams for retreatment by at least one of the ultrafiltration units and the reverse osmosis membrane to produce an oil and WSO-depleted stream.

22. A method as set forth in claim 21 wherein the ultrafiltration is a single pass ultrafiltration.

23. A method as set forth in claim 21 wherein the retreatment comprises ultrafiltration followed by reverse osmosis.

24. A method as set forth in claim 23 wherein acid is added to the reject stream.

25. A method as set forth in claim 21 wherein acid is added to the reject stream.

26. A method as set forth in claim 21 wherein the recycling stream is treated with a hydrocarbon/crude oil conductor before retreatment by ultrafiltration.

27. A method as set forth in claim 21 wherein the recycling stream is directed back to a point before the pre-treating step.

28. A method as set forth in claim 21 wherein the recycling stream is directed back to a point after the pre-treating step, but before the ultrafiltration step.

* * * * *